(12) United States Patent
Schmid et al.

(10) Patent No.: US 7,788,981 B2
(45) Date of Patent: Sep. 7, 2010

(54) PRESSURE MEASUREMENT DEVICE AND SYSTEM, AND METHOD FOR MANUFACTURING AND USING THE SAME

(75) Inventors: Noa Schmid, Kriens (CH); Helmut Knapp, Ebikon (CH); Janko Auerswald, Lucerne (CH); Christian Andreas Bosshard, Lausen (CH); Mark Fretz, Lucerne (CH); Anne-Claire Pliska, Hausen am Albis (CH)

(73) Assignee: CSEM Centre Suisse d'Electronique et de Microtechnique SA - Recherche et Developpement, Neuchatel (CH)

( * ) Notice: Subject to any disclaimer, the term of this patent is extended or adjusted under 35 U.S.C. 154(b) by 170 days.

(21) Appl. No.: 12/075,864

(22) Filed: Mar. 14, 2008

(65) Prior Publication Data

US 2008/0223141 A1 Sep. 18, 2008

Related U.S. Application Data

(60) Provisional application No. 60/907,013, filed on Mar. 16, 2007.

(51) Int. Cl.
 *G01L 9/06* (2006.01)
(52) U.S. Cl. ................. 73/721; 73/715; 361/283.1
(58) Field of Classification Search ............ None
 See application file for complete search history.

(56) References Cited

U.S. PATENT DOCUMENTS

| | | | |
|---|---|---|---|
| 2,440,198 A | 4/1948 | Green | |
| 2,602,329 A | 7/1952 | Clark | |
| 4,655,088 A | 4/1987 | Adams | |
| 5,257,547 A * | 11/1993 | Boyer | 73/756 |
| 5,359,887 A | 11/1994 | Schwab et al. | |
| 5,983,727 A | 11/1999 | Wellman et al. | |
| 6,263,741 B1 * | 7/2001 | Woias | 73/861.47 |

(Continued)

FOREIGN PATENT DOCUMENTS

EP 0 813 049 12/1997

(Continued)

OTHER PUBLICATIONS

Xiao, G., et al: "A Pressure Sensor Using Flip-Chip on Low-Cost Flexible Substrate," 2001 Electronic Components and Technology Conference, IEEE (5 pp), 2001.

*Primary Examiner*—Lisa M Caputo
*Assistant Examiner*—Jermaine Jenkins
(74) *Attorney, Agent, or Firm*—Weingarten, Schurgin, Gagnebin & Lebovici LLP

(57) ABSTRACT

The present invention discloses a pressure measurement device comprising: a substrate that includes at least one pressure sensing module and at least one fluid-conductive channel, wherein each channel has a first aperture and a second aperture. The substrate is flexible such that the pressure measurement device is conformably adjustable onto an object's surface. The first aperture is located on the substrate such that when the substrate is suitably adjusted onto the object's surface, the first aperture is open to the exterior of the object's surface. The pressure sensors module is operatively connected to at least one of the second apertures, such that the at least one pressure sensing module is generally being subjected to the pressure being present at the first aperture.

14 Claims, 11 Drawing Sheets

U.S. PATENT DOCUMENTS

| | | | |
|---|---|---|---|
| 6,298,730 B1 * | 10/2001 | Yamagishi et al. | 73/723 |
| 6,484,589 B1 * | 11/2002 | Brock | 73/861.18 |
| 6,588,281 B2 * | 7/2003 | Kurtz et al. | 73/754 |
| 6,595,066 B1 * | 7/2003 | Kurtz et al. | 73/721 |
| 6,662,647 B2 | 12/2003 | Schoess et al. | |
| 6,826,968 B2 | 12/2004 | Manaresi et al. | |
| 7,127,948 B2 | 10/2006 | Tavares et al. | |
| 2006/0156805 A1 | 7/2006 | Sawada | |
| 2006/0179952 A1 | 8/2006 | Tavares et al. | |

FOREIGN PATENT DOCUMENTS

| | | |
|---|---|---|
| EP | 1 785 713 | 5/2007 |

\* cited by examiner

PRESSURE MEASUREMENT DEVICE AND SYSTEM, AND METHOD FOR MANUFACTURING AND USING THE SAME

CROSS-REFERENCE TO RELATED APPLICATIONS

This patent application claims priority from U.S. Provisional Patent Application No. 60/907,013 filed on Mar. 16, 2007, the Application which is incorporated herein by reference in its entirety.

FIELD OF INVENTION

The present invention relates to the field of measurement of fluid characteristics and more specifically to the measurement of pressure exerted by fluids on a surface.

SUMMARY OF SOME EMBODIMENTS OF THE INVENTION

The present invention discloses inter alia, a pressure measurement device comprising: a substrate that includes at least one pressure sensing module and at least one fluid-conductive channel, wherein each channel has a first aperture and a second aperture. The substrate is flexible such that the pressure measurement device is conformably adjustable onto an object's surface. The first aperture is located on the substrate such that when the substrate is suitably adjusted onto the object's surface, the first aperture is open to the exterior of the object's surface. The pressure sensors module is operatively connected to at least one of the second apertures, such that the at least one pressure sensing module is generally being subjected to the pressure being present at the first aperture.

In embodiments of the invention, the first aperture is remotely located from the pressure measurement module.

In embodiments of the invention, the pressure sensing module comprises a membrane made of a piezo-responsive material.

In embodiments of the invention, the piezo-responsive material is either one a piezo-resistive and piezo-electric material.

In embodiments of the invention, the pressure sensing module is both one of an absolute pressure sensing module and a differential pressure sensing module.

In embodiments of the invention, the at least one channel has a diameter ranging between 0.05 and 0.5 mm.

In embodiments of the invention, the substrate has a thickness of less than 1 mm.

In embodiments of the invention, the pressure measurement device further comprises absorption means that are sandwiched between the substrate and either one the membrane and the interface unit to avoid generating stress in membrane generated due a difference in temperature-based expansion between membrane and substrate.

The present invention further discloses a pressure measurement system, comprising of a signal processing module; and a pressure measurement device that includes the at least one pressure sensing module, wherein the at least one pressure sensing module is operatively connected to said signal processing module by wire or wireless communication.

BRIEF DESCRIPTION OF THE DRAWINGS

These and further features and advantages of the invention will become more clearly understood in the light of the ensuing description of a some embodiments thereof, given by way of example only, with reference to the accompanying figures, wherein:

FIG. 11A is a flow-chart illustration of a method for manufacturing the pressure measurement device according to an embodiment of the invention; and.

Figure 1:
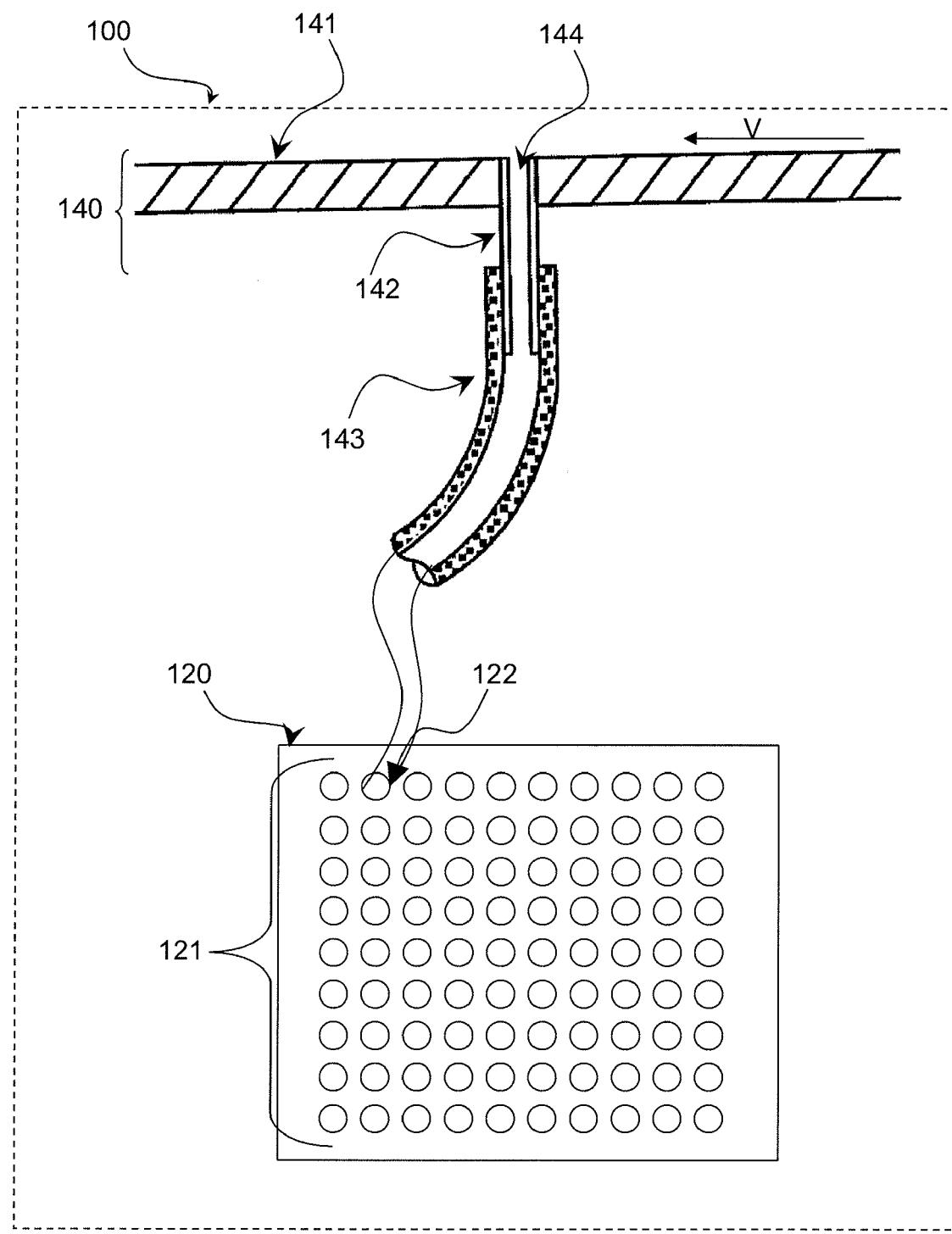
FIG. 1 is a schematic cross-sectional side view illustration of a pressure measurement device and system as used in the art.

The drawings taken with description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical and analogous elements but may not be referenced in the description for all figures.

BACKGROUND OF INVENTION

Pressure sensors are widely used for the analysis and monitoring of the pressure distribution on an object's surface subjected to the flow of fluid such as liquid and/or gas. For example, pressure sensors may be adjusted on an aircraft's airfoil to provide the pilot or manufacturer of the same aircraft with information about the airfoil's pressure distribution for monitoring and analysis. Moreover, pressure sensors can be used as an engineering tool to optimize the aerodynamic and/or hydrodynamic properties of an object's surface according to predetermined criteria. For example, information received from the pressure sensors arranged on a vehicle may be analyzed to derive the drag exerted by, e.g., air, on the vehicle in motion, and in particular, to determine which areas of the vehicle's surface are subjected to the highest drag and should therefore be reshaped to lower the vehicle's drag below a predetermined threshold value.

It should be noted that the pressure measured by such a pressure sensor may be the equivalent of the sum of dynamic pressure and/or static pressure acting on the object's surface.

Pressures measurement devices and systems as used in the art are outlined hereinafter. With reference to FIG. 1, a pressure measurement device and system 100 as used in the art includes a pressure transducer unit 120 comprising an array of pressure transducers 121 to measure the pressure a fluid exerts on a surface 141 of an object 140. To enable the measurement of the pressure, object 140 comprises measuring taps 142, to which at least some of the pressure transducers 121 are respectively coupled via a tube 143, which are pressed and/or glued or otherwise fixedly inserted into holes 144. Some of the fluid flowing over surface 141 exerts dynamic pressure thereon and engages therefore with measuring taps 142. Consequently, some fluid flows through the respective tubes 143 towards the corresponding member 122 of the transducer array 121 and exerts a pressure on the pressure sensor which is operatively coupled to member 122. The pressure exhibited by the fluid on the pressure sensor of member 122 depends, inter alia, on the velocity of the fluid, which is schematically indicated with arrow "V", flowing over surface 141. As is known from thermodynamics, an increase in fluid velocity may for example result in a expansion of the fluid flowing over surface 141 (a physical phenomenon described, e.g., by means of the Bernoulli equation), whereby the increase in expansion may result in a decrease of the pressure exerted by the fluid in tube 143 and thus on the respective pressure sensor of transducer member 122. In the art, a pressure transducer unit 110 may be embodied by a single pressure transducer (not shown) which is operatively couplable to measuring tap 142 for the measurement of pressure on surface 141 on the respective location. The outer diameter of tubes 143 might be around 2 mm, whereas taps 142 may have an outer diameter of approx. 1 mm. The diameter of the channel of tap 142 can be as small 0.1 mm. Other pressure measurement devices as used in the art are outlined hereinafter.

U.S. Pat. No. 5,359,887, which is incorporated herein by reference in its entirety, discloses a coating material for wind tunnel luminescent barometry of surfaces such as airfoils and airframes uses a resin such as poly[1-(trimethylsilyl)propyne], or a siloxane polymer, to carry a pressure indicator. The pressure indicator may be photoluminescent ruthenium complex, such as [Ru(Ph2phen)2]Cl2, a photoluminescent platinum complex, such as PtOEP, and photoluminescent mixtures of pyrene and perylene.

U.S. Pat. No. 5,983,727, which is incorporated herein by reference in its entirety, discloses a fluid pressure sensor/sensor array having a substantially incompressible mounting structure with a cavity formed therein. An elastic membrane is attached to said mounting structure and across said cavity, separating the cavity from the fluid to be measured. At least one non-contact transducer is attached to the mounting structure in the cavity to detect deflection at a selected plurality of regions on the membrane. The sensitivity and pressure range of the sensor can be chosen by preselecting the elasticity of the membrane, stretching the membrane across the cavity under a preselected tension, maintaining a predetermined reference pressure in the cavity, and/or actively controlling the membrane tension. For a pressure sensor array, there are at least two fluid pressure sensors, where at least one sensor is of the type described herein. A sensor array can also be formed by multiple cavities within a single mounting structure.

U.S. Pat. No. 6,662,647, which is incorporated herein by reference in its entirety, discloses a gaseous fluid data sensor assembly for acquiring data regarding the ambient environment adjacent a surface of an airframe with adjacent air speeds below 40 knots (or another aerodynamic structure with low speed gaseous fluid flow adjacent thereto) having a flexible substrate adhesively conforming to the airframe surface, a conformable cover layer and a relatively thin air data sensor for measuring air pressure between the substrate and the cover layer. The assembly also includes a fiber optic communication link, a battery, a data acquisition subsystem, and a flexible printed circuit, all between the substrate and the cover layer. The cover layer is formed of a polymer film.

U.S. Pat. No. 6,826,968, which is incorporated herein by reference in its entirety, discloses a device for detecting the pressure exerted at different points of a flexible and/or pliable object that may assume different shapes. The device includes a plurality of capacitive pressure sensors and at least a system for biasing and reading the capacitance of the sensors. The requirements of flexibility or pliability are satisfied by capacitive pressure sensors formed by two orthogonal sets of parallel or substantially parallel electrodes spaced, at least at each crossing between an electrode of one set and an electrode of the other set, by an elastically compressible dielectric, forming an array of pressure sensing pixel capacitors. The system for biasing and reading the capacitance includes column plate electrode selection circuits and row plate electrode selection circuits and a logic circuit for sequentially scanning the pixel capacitors and outputting pixel values of the pressure for reconstructing a distribution map of the pressure over the area of the array.

U.S. Pat. No. 7,127,948, which is incorporated herein by reference in its entirety, discloses a sensor, sensory array, and associated method for measuring a pressure, wherein the sensor includes a piezoelectric sensory device that is disposed on an electrically insulative substrate that can be adhered to a member for measuring the pressure on the member. The piezoelectric sensory device defines first and second contact surfaces and is adapted to provide an electric potential between the surfaces that corresponds to a pressure on the piezoelectric sensory device. Conductive terminals are in electrical communication with the piezoelectric sensory device and therefore also provide the electric potential indicative of the pressure on the surface of the test member. An electrically insulative sheet is disposed opposite the piezoelectric sensory device from the substrate. An electronic monitoring device can be electrically connected to the piezoelectric sensory device via the terminals and configured to monitor the electric potential provided by the piezoelectric sensory device.

Xiao et al. describe in "A Pressure Sensor Using Flip-Chip on Low-Cost Flexible Substrate", published in IEEE 2001 Electronic Components and Technology Conference, which is incorporated herein by reference in its entirety, a pressure sensor and an actuator which were assembled on a flexible substrate using FCOF technology, and a photolithography process allegedly meeting the solder bump fabrication requirement of the sensor chip.

DESCRIPTION OF SOME EMBODIMENTS OF THE INVENTION

It is the object of the present invention to provide an alternative device, system and method for measuring the pressure exerted on an object's surface by a fluid. The device and system are hereinafter referred to as "pressure measurement device" and "pressure measurement system", respectively. The pressure measurement device according to an embodiment of the invention comprises a substrate, which may be flexible, bendable lightweight. The device may for example, weigh less than 10 grams. Thusly configured, the device may be conformably adjustable onto an object's surface.

The substrate may include one or more fluid-conductive channels, each of which may have a first and a second aperture, wherein the channels may be micro-sized.

A pressure sensing module (PSM) is provided on the substrate such that the PSM is operatively connected to the second aperture, i.e., the second aperture may be open to and terminate in the PSM. In some embodiments, the first and the second aperture may be remotely located from each other. Correspondingly, a respective PSM may be remotely located from the first aperture and therefore from the location for which the pressure is being measured by for example, at least 10 cm. The device is configured such that when it is suitable adjusted onto an object's surface, the first aperture of such a channel is open in direction to the exterior of the object's surface layer. Thusly adjusted, at least some fluid surrounding the object may flow through such a first aperture, and via the respective channel to the second aperture that terminates in the PSM. Therefore, the pressure exerted by the fluid on the location of the first aperture is measured by the corresponding PSM. The substrate may have a thickness of, e.g., less than 1 mm. Moreover, the substrate has a planar-like extent and may cover a surface area ranging from a few square centimeters to a few square meters and may for example cover a surface area of approximately 20 mm*180 mm. The PSM may cover an area of, for example, approximately 20 mm*25 mm and may have a thickness of, e.g., less than 3 mm.

The pressure measurement device may additionally include a signal processing (SP) module that is responsively coupled to at least some of the PSMs. The SP module may have a thickness of e.g., less than 10 mm.

The substrate thus enables large-area covering of at least some part of an object's surface. Accordingly, the pressure measurement device enables the measurement of pressure distribution of a large area (for e.g. stall detection on airfoils). Since the substrate may be flexible and/or cover large areas and/or may have a relatively low mass, the pressure measurement device may be detachably coupleable on large surface areas by employing low-force coupling means, and is thus easily repositionable. Such coupling means may be, for example, glues employing low-adhesive forces of about less than about 500 grams per cm between two materials.

Objects on which the pressure measurement device is conformably adjustable include but are not limited to wind tunnel facilities, wings, propellers, fans, turbo-machinery, turbine blades, airfoils, aquafoils, vehicles (e.g. race cars, trains), aircrafts (e.g. engineless aircraft, glider, fighter plane, passenger plane, unmanned aerial vehicles), sails, maritime vessels (e.g., sail ships, motorboats, warships, submarines), rockets, missiles, watercrafts, helmets, surfing boards, bob sleds, sportswear, piping systems, ventilation systems, air conditioning systems, compressors, valves, pumps, blowers (e.g. vacuum cleaners, leaf blowers, hair dryers), hydropower generators and hydropropulsion equipment.

In addition, by conforming pressure measurement device closely to the contour of an object to which it is attached, there may be minimal or even negligible effect on the liquid flow characteristics (e.g. pressure) in the object's surface layer being sensed.

It should be understood that an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It should be understood that the phraseology and terminology employed herein is not to be construed as limiting and is for descriptive purpose only.

The principles and uses of the teachings of the present invention may be better understood with reference to the accompanying description, figures and examples.

It should be understood that the details set forth herein do not construe a limitation to an application of the invention. Furthermore, it should be understood that the invention can be carried out or practiced in various ways and that the invention can be implemented in embodiments other than the ones outlined in the description below.

It should be understood that the terms "including", "comprising", "consisting" and grammatical variants thereof do not preclude the addition of one or more components, features, steps, integers or groups thereof.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The terms "right", "left", "bottom", "below", "lowered", "low", "top", "above", "elevated", "high", "vertical" and "horizontal" as well as grammatical variations thereof as used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Although some demonstrative embodiments of the invention are not limited in this regard, discussions utilizing terms such as, for example, "processing," "computing," "calculating," "determining," "establishing", "analyzing", "checking", "identifying" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to execute operations and/or processes and/or applications.

It should be understood that where the claims or specification refer to "a" or "an" element, such reference is not to be construed as there being only one of that element.

It should be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein ought to be commonly understood as by one of ordinary skill in the art to which the invention belongs, unless otherwise defined.

The present invention can be implemented in the testing or practice with methods and materials equivalent or similar to those described herein.

Figure 2A:
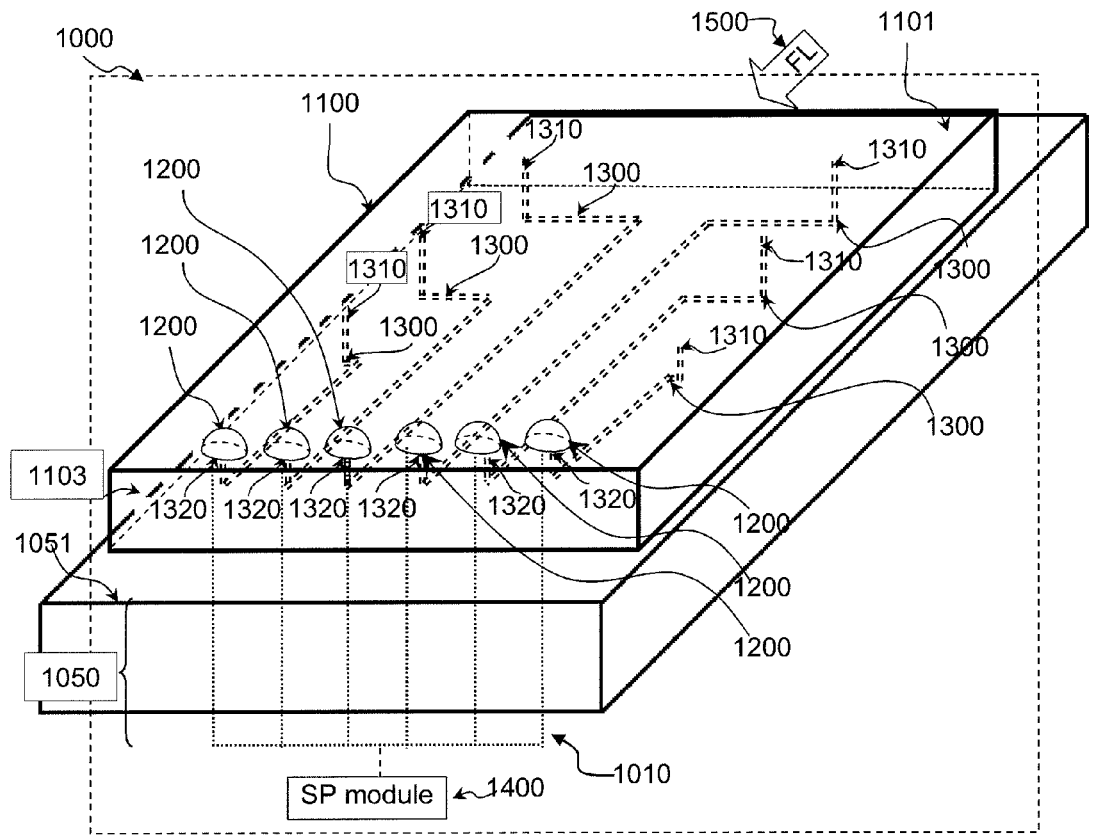
FIG. 2A is schematic isometric illustration of a pressure measurement device and system, according to some embodiments of the invention, wherein the device is conformably adjusted on an object's surface.
Figure 2B:
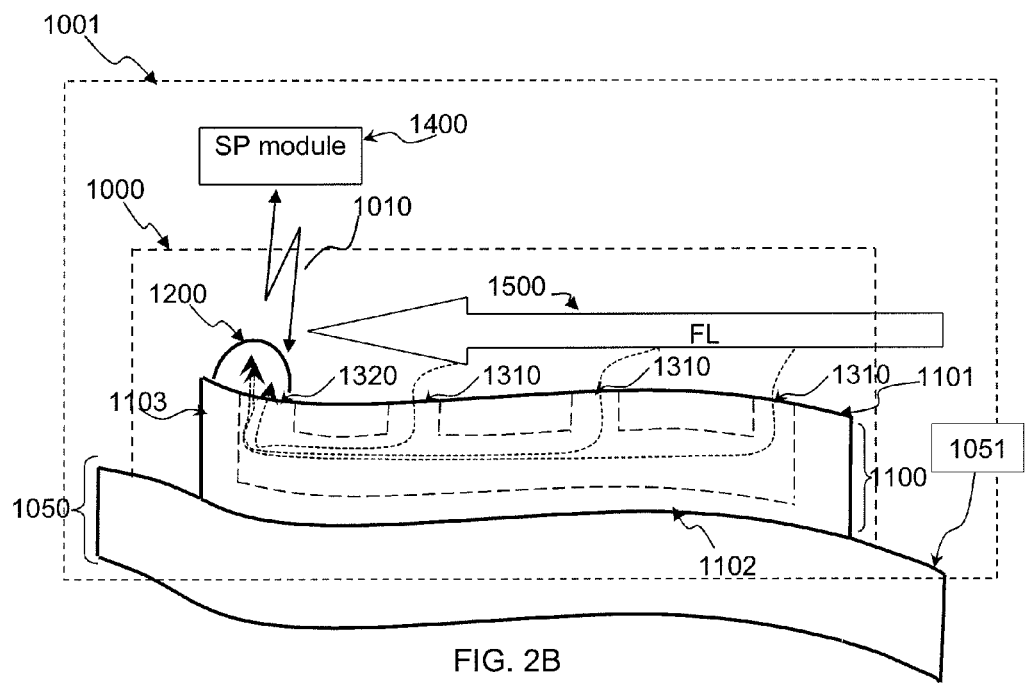
FIG. 2B is a schematic side view illustration of the pressure measurement device and system according to some embodiments of the invention, wherein the device is conformably adjusted on the object's surface.
Figure 3A:
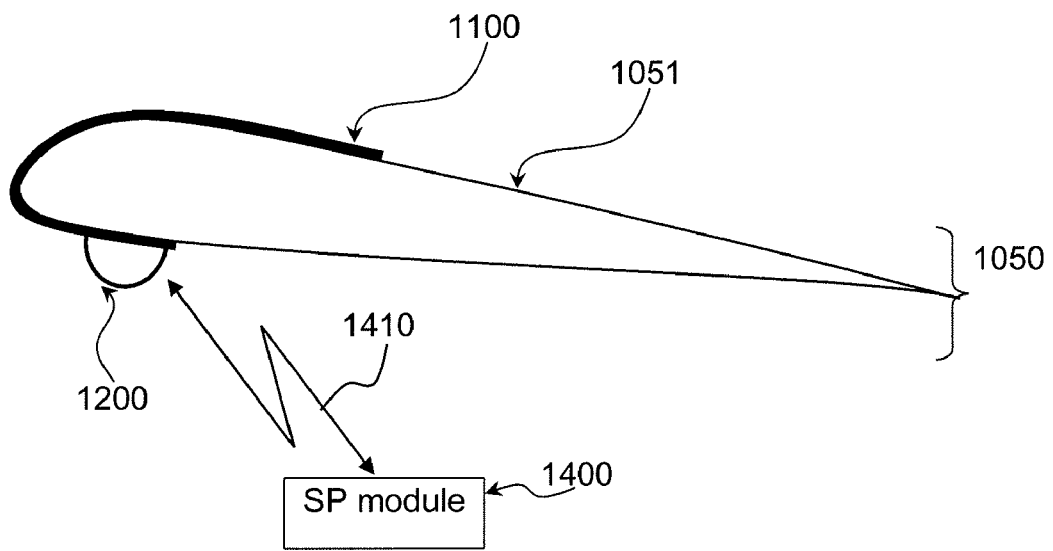
FIG. 3A is a schematic side view illustration of the pressure measurement device and system, wherein the device is conformably adjusted on a surface's object which is embodied by an airfoil.

Reference is now made to FIG. 2A, FIG. 2B and FIG. 3A. According to some embodiments of the invention, a pressure measurement device 1000 includes a substrate 1100, which may be flexible or bendable and which has an upper and lower boundary 1101 and 1102, respectively. Substrate 1100 includes one or more channels 1300 each having a first aperture 1310 and a second aperture 1320. First apertures 1310 may be open towards the exterior of substrate's 1100 boundary, whereas second apertures 1320 of respective channels 1300 may be open towards and terminate in corresponding PSMs 1200. In some embodiments, first apertures 1310 may be remotely located from second apertures 1320. Accordingly, PSMs 1200 may be located remotely from first aperture 1310 by, e.g., a few centimeters. Thusly configured, PSMs 1200 may not disturb the flow of fluid over first aperture(s) 1310.

First apertures 1310 may be formed in substrate 1100 in accordance to various patterns such as, for example, a n*n matrix of first apertures 1310. FIG. 2A for example schematically illustrates a 2*3 matrix of first apertures 1310 arranged on substrate 1100. In some embodiments of the invention, numerous first apertures 1310 may be crowded closely together for the measurement of pressure exerted onto a given location, thereby providing redundancy for the pressure measurement of said given location in case that one or more channels respective to said first apertures 1310 are blocked. According to some embodiments of the invention, for both the measurement of gasesous and liquid fluids, the diameter of channels 1300 may range, for example, from 0.05 and 0.5 mm. The optionally flexible properties of pressure measurement device 1000 renders pressure measurement device 1000 conformably adjustable on a surface of object 1050 which may attain or may have various shapes. For example, as is schematically demonstrated with FIG. 3A, an object 1050 may have the shape of an airfoil having an upper and a lower surface 1051 and 1052, respectively. By fittedly adjusting lower boundary 1102 of substrate 1100 on upper surface 1051 such that all or most of first apertures 1310 are located above upper surface 1051, PSMs 1200 of respective first apertures 1310 are subjected to the pressure exerted by at least some of the fluid flowing over upper boundary 1051. Thusly configured, the pressure exerted by fluid directly on upper surface 1051 at the corresponding planar locations of first apertures 1310 can be derived in accordance to the pressure being measured by PSMs 1200. For example, if the pressure measured at a given first aperture 1310 by means of the respective PSM 1200 is about 20 millibars, it may for example be assumed that if substrate 1100 was not adjusted on object 1050, approximately the same amount of pressure would be exerted by a fluid directly on upper surface's 1051 planar location that corresponds the location of the given first aperture 1310. Thus, pressure measurement device 1000 enables obtaining an approximation of the pressure distribution on any objects' surface such as, for example, upper surface 1051 of object 1050.

It should be noted that terms like "flowing over a boundary", "flowing over a surface" and grammatical variations thereof, include the meaning of "flowing on a boundary", "flowing at boundary", "flowing on a surface", "flowing at surface", and grammatical variations thereof.

For exemplary and simplification purposes only, the shape of object 1050 not having adjusted thereon pressure measurement device 1000 is hereinafter referred to as "original shape", whereas the shape of object 1050 having adjusted thereon pressure measurement device 1000 is hereinafter referred to as "new shape" of object 1050, i.e., new shape of object 1050 takes into account the boundaries of pressure measurement device 1000. Correspondingly, new upper surface 1051, takes for example into account substrate 1100 adjusted thereon.

Figure 3B:
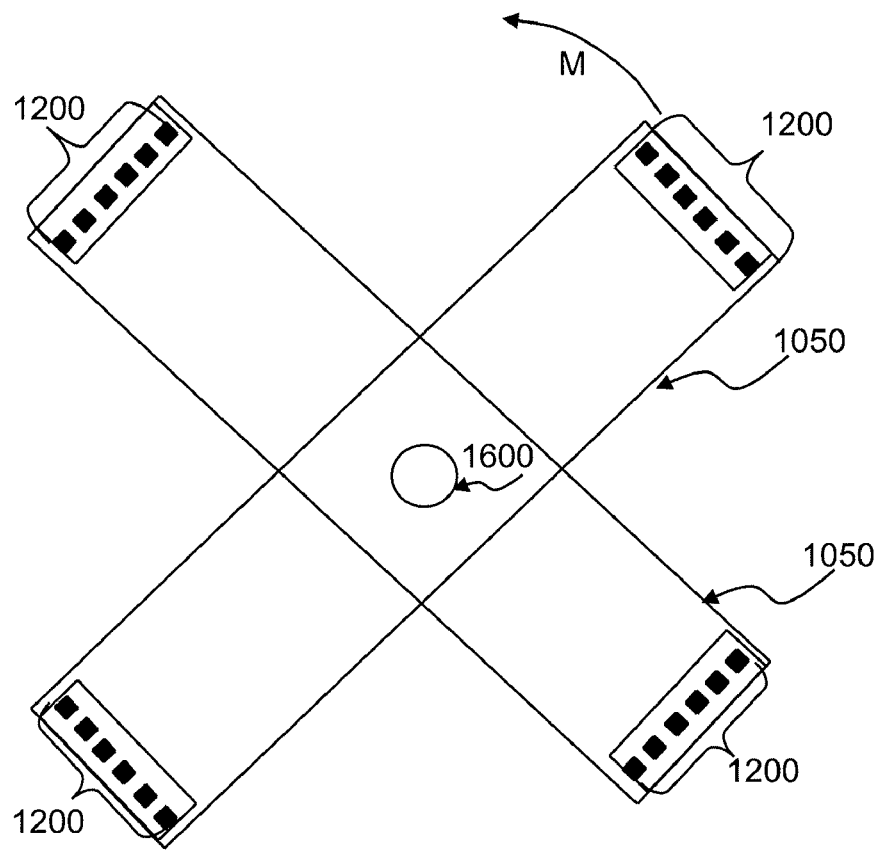
FIG. 3B is a schematic side view illustration of the pressure measurement device and system, wherein the device is conformably adjusted on the object's surface, and wherein the object is embodied by a rotatably coupled object.

In some embodiments of the invention, pressure measuring device 1000 is conformably adjustable on object 1050 such that the new shape of object 1050, which takes into account the boundaries of pressure, measurement device 1000, deviates only minimally from object's 1050 original shape. Thusly configured, the measurements obtained by adjusting pressure measurement device 1000 on object 1050 provide a relatively accurate approximation of the pressure that would be exerted on object's 1050 surface by fluid, if pressure measurement device 1000 was not adjusted on object 1050. Taking into consideration the above-mentioned requirements, substrate 1100 and/or PSMs 1200 may for example be as thin as possible and/or may have an aerodynamic shape to reduce drag and/or turbulence. For example, substrate 1100 and/or PSMs 1200 may be shaped such that the edges of either or both of them may be flush or substantially flush with the surfaces of object 1050; that the thickness of substrate 1100 and/or PSMs 1200 is a small as possible; and/or that the protrusion of PSMs 1200 is as small as possible and/or that PSMs 1200 are for example aerodynamically (e.g. dome-) shaped. Correspondingly, in the event that one wants to measure the pressure distribution on upper boundary 1051 and PSMs 1200 protrude from substrate 1100, it is advantageous to conformably adjust lower boundary 1102 of substrate 1100 on object 1050 such that PSMs 1200 are located below lower boundary 1052 as is schematically illustrated in FIG. 3B. Thusly adjusted, flow of fluid over new upper boundary 1051 remains substantially unobstructed.

Substrate 1100 may be made of any suitable material such as, for example, a polymer material, which may be, e.g., polymide, polyester, polyethylene, polypropylene, Polyethylene terephthalate(PET), Polytetrafluoroethylene (PTFE), polyetheretherketone (PEEK) or as a sandwich structure of different polymers, metals, adhesives or any combination thereof.

According to some embodiments of the invention, a pressure measurement system 1001 may comprise pressure measurement device 1000 and a signal processing (SP) module 1400. Further, at least one of PSMs 1200, which is operatively connected to respective channels 1300, may be adapted to transmit by wire (by means of, e.g., a flexible printed-circuit board (PCB) having integrated therein electron-conductive channels) or wirelessly data representing information about the relative or absolute pressure prevailing in channels 1300 to SP module 1400, which may be adapted to analyze and display the information. SP module 1400 may for example, comprise a receiver (not shown), an analog-to-digital converter (not shown) and an amplifier (not shown) and a multiplexer (not shown), all of which are operatively connected to a power supply (not shown). Correspondingly, pressure measurement system 1001 may enable a user thereof to provide the user with an approximation of the pressure being present at locations on object's 1050 surface corresponding to the locations of first apertures 1310 on upper boundary 1101. Hence, pressure measurement system 1001 enables to approximately map the pressure on upper surface 1051.

Additional reference is now made to FIG. 3B. Wired transmission of the information to SP module 1400 from PSMs 1200 that are arranged on object 1050 delineating a rotating movement around an axis 1600, as is schematically indicated with arrow M, may not be suitable since the resulting rotating movement of PSMs 1200 may cause obstructive entanglement of communication wires operatively coupled to PSMs 1200, and PSMs 1200 may thus be decoupled from the SP module handling and transmitting the pressure data. In distinct contrast, PSMs 1200 that are adapted to transmit data wirelessly are employable on rotating objects (e.g., propellers, turbine blades) for the transmission of the pressure information to SP module 1400, since the omission of communication wires eliminates the problem of obstructive entanglement. It should further be noted that employing PSMs 1200 adapted to transmit data wirelessly, may substantially reduce the set-up time of pressure measurement system 1001, since no communication wires have to be guided from and/or along object 1050 to SP module 1400. Accordingly, pressure measurement device 1000 may include at least one wireless transmission module (not shown) that is operatively coupled to or integrated in PSMs 1200. To enable such wireless transmission, the wireless transmission module may comprise, inter alia, of an amplifier and a control module all or some of which may be integrated, for example, in substrate 1100.

Figure 4A:
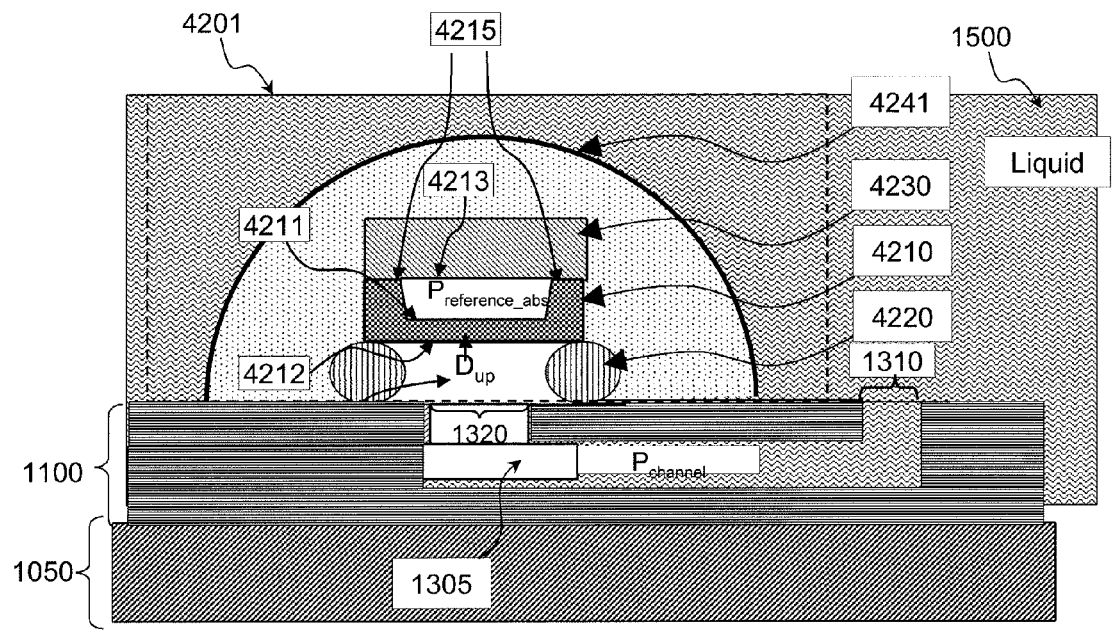
FIG. 4A is a detailed schematic cross-sectional side view illustration of an absolute pressure measurement device according to some embodiments of the invention, wherein the device is conformably adjusted on the surface's object and surrounded by a liquid fluid.

Referring now to FIG. 4A a PSM 1200 may optionally be embodied by an absolute PSM 4201. Absolute PSM 4201 may include a membrane 4210, which may be concavely shaped. Membrane 4210 is responsively positioned in absolute PSM 4201 with regard to the pressure that may prevail in channel 1300. Correspondingly, as is schematically illustrated in FIG. 4A, membrane 4210 may be fixedly adjusted by suitable absorption means 4220 within membrane 4210 such that at least some of lower boundary 4212 thereof faces second aperture 1320 of channel 1300. Such absorption means 4220 may be embodied or may also have properties of, for example, adhesives which are sandwiched between membrane 4210 and upper boundary 1101 of substrate 1100. The adhesives may be flexible and/or pliable to minimize and/or cancel out and/or compensate in membrane 4210 for a possible deflection or movement of substrate 1100. Membrane 4210 and substrate 1100 may each have different temperature-based coefficient of expansions. Therefore, membrane 4210 and substrate 1100 may be coupled to each other and/or configured in a manner to be unaffected by such different temperature-based difference in expansion. For example, absorption means such as, for example, absorption means 4220 may therefore be made of a material having a relative low modulus of elasticity of, e.g., less than 2 GPa, to avoid generating stress in membrane 4210 that may be generated due a difference in temperature-based expansion between membrane 4210 and substrate 1100. Examples for suitable materials of which absorption means may be made of are silicon; and epoxy or even solder material with underfill if concave portion of membrane 4210 faces upwardly (i.e., away from) second opening 1320. Membrane 4210 may be made, for example, of a monocrystalline silicon. To enable the conductance of a signal that corresponds to the deflection of membrane 4210 outside substrate 1100, at least some portions of absorption means 4220 may be conductive (e.g. at least at the contact area between membrane 4210 and absorption means 4210).

It should be noted that in order to enable vertical displacement of upper boundary 4211, as is schematically indicated with arrow $D_{up}$, at least some part of upper and lower boundary 4211 and 4212, respectively, ought to be positioned in front of respective cavities 4213 and 4214. Such cavities may be established, for example, by employing a sensor membrane of which at least one side thereof, which is positioned opposite to second aperture 1320, is concavely formed, whereas only the edges of the other side of the same sensor membrane are being supported by absorption means 4220. For example, as is schematically illustrated, inter alia, in FIG. 4A, upper boundary 4211 is concavely formed, whereas lower boundary 4212 is only supported on the edges by absorption means 4220. Thusly configured, membrane 4210 may move in accordance to the pressure exerted thereon. For example, if the pressure established in channel 1300 is higher than the pressure prevailing in upper cavity 421, then membrane 4210 may deflect upwardly as is schematically indicated with arrow $D_{up}$.

It should be noted that when referring to absolute PSMs such as, for example, absolute PSM 4201, then the pressure in cavity 4213 is hereinafter referred to as "$P_{reference\_abs}$", which may be close to a pressure corresponding to vacuum, or which may be significantly smaller than the pressure prevailing in channel 1305 by, e.g., at least 10 factors when under normal conditions (e.g. when pressure in channel 1305 is about equal to atmospheric pressure. The pressure prevailing in channel 1305 is hereinafter referred to as $P_{channel}$. Consequently, $P_{channel}$ may correspond to an absolute pressure value prevailing at first opening 1310 and membrane 4210 may only deflect upwardly ($D_{up}$)

It should further be noted that for exemplary purposes only and to simplify the discussion herein, the pressure against which $P_{channel}$ is measured may also include or take into account the pressure exerted by membrane 4210 itself due to the mechanical properties thereof. Therefore, making reference to a term like "pressure prevailing in upper cavity, may also include the pressure that is exerted against $P_{channel}$ due to the mechanical properties of membrane 4210.

Moreover, it should be noted that other configurations enabling the deflection of membrane 4210 in response to pressure may be possible, as outlined hereinafter.

Absolute PSM 4201 may further include an interface unit 4230 that may be responsively connected to membrane 4210, which may be embodied, for example, by means of a piezo-responsive (e.g. piezo resistive or -electric) material that is operatively coupled to interface unit 4230. Such a piezo-responsive material is responsive to the material's deflection and/or bending, and/or movement. Such deflection, bending, and/or movement may be caused by mechanical stress applied on the piezo-responsive material. Accordingly, interface unit 4230 may be embodied by an electronic circuit that is responsive to the changes of the electrical resistance. For example, interface unit 4230 may be adapted to convert these changes of electrical resistance into current changes. Additionally or alternatively, interface unit 4230 may be adapted to convert these changes of electrical resistance into corresponding voltage changes. Non-limiting examples of materials of which interface unit 4230 may be made of include glass (e.g. Pyrex, Borofloat) and silicon. Other suitable materials may be used.

It should be noted PSM 1200 may be embodied by alternative types of sensors, e.g., as known in the art such as, for example, capacitive sensors or acoustic sensors, wherein in case of acoustic sensors, channels 1300 may act as acoustic waveguides.

To maximize the accuracy of the absolute pressure measure exerted on membrane 4210, upper cavity 4213 as well as lower cavity 4214 are sealed. In addition, the pressure $P_{reference\_abs}$ prevailing in upper cavity 4213 may be equal or close to vacuum. It should be noted that the meaning of the term "sealed" also encompassed the meaning of the term "substantially sealed" and the like. It should also be noted that the meaning of the term "vacuum" as used herein encompasses the meaning of the terms "substantial vacuum", "approximate vacuum" and the like.

Optionally, PSM 1200 may be equipped with a protective coating which may have various shapes. For example, as is schematically indicate in FIG. 4A, a protective coating may be implemented by a dome-shaped coating 4241 and may be useful to protect conductive contacts (like, e.g. contacts 4215) from corrosion. Parylene or any other suitable material may be employed as a protective coating.

Pressure measurement device 1000 may be used to measure hydrodynamic pressure. For example, flow of liquid 1500 against second aperture 1320 of channel 1300 may result in the generation of an airpocket 1305 trapped between liquid 1500 and lower side of membrane 4210. The pressure $P_{channel}$ exerted on membrane 4210 corresponds to the pressure exerted by liquid 1500 on the airpocket 1305. Therefore, hydrodynamic pressure may be measured by means of pressure measurement device 1000. It should be noted that measuring hydrodynamic pressure is for exemplary purposes only outlined in association with absolute PSM 4201, though other PSMs may be used for the measurement of hydrodynamic pressure as well It should further be noted that all absolute PSMs outlined hereinafter are similarly configured as absolute PSM 4201, except for the differences indicated.

Figure 4B:
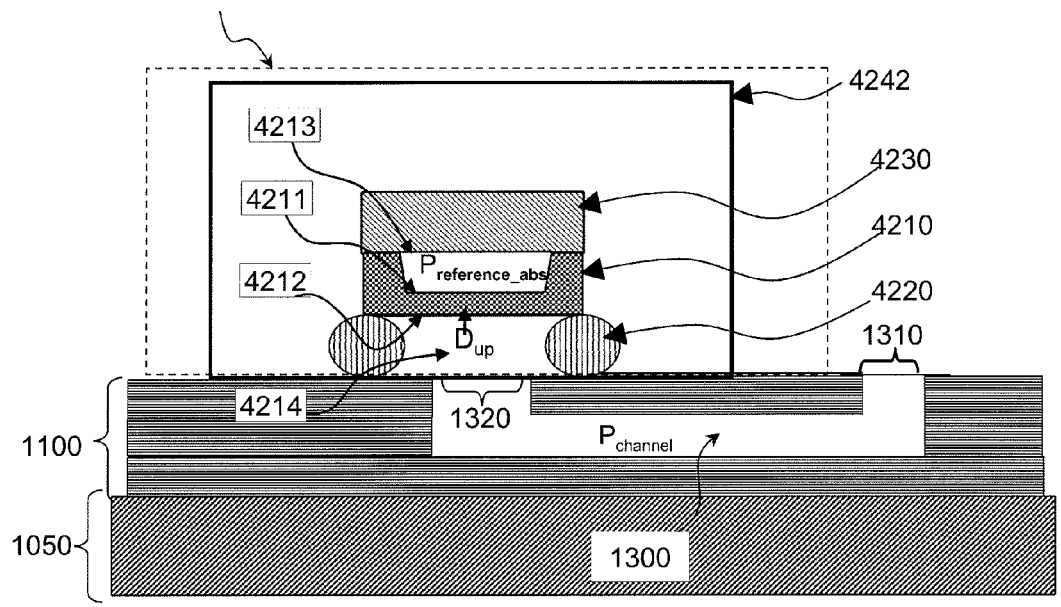
FIG. 4B is a schematic cross-sectional side view illustration of an absolute pressure measurement device according to an alternative embodiment of the invention, wherein the device is adjusted on the surface's object.

Turning now to FIG. 4B, an absolute PSM 4202 is schematically illustrated, which may be equipped with a protective cover that may be embodied, for example, by a rectangularly shaped housing 4242 made of, e.g., any suitable material such as, e.g., flame resistant-(FR) 4 used for printed circuit boards. It should be noted that meaning of the term "rectangular" and grammatical variations thereof also encompasses the meaning of the term "substantially rectangular" and "approximately rectangular". To enable the conductance of a signal that corresponds to the deflection of membrane 4210 outside substrate 1100, at least some suitable portions of absorption means 4220 may be conductive (e.g. at least at the contact area between membrane 4210 and absorption means 4210).

Figure 5A:
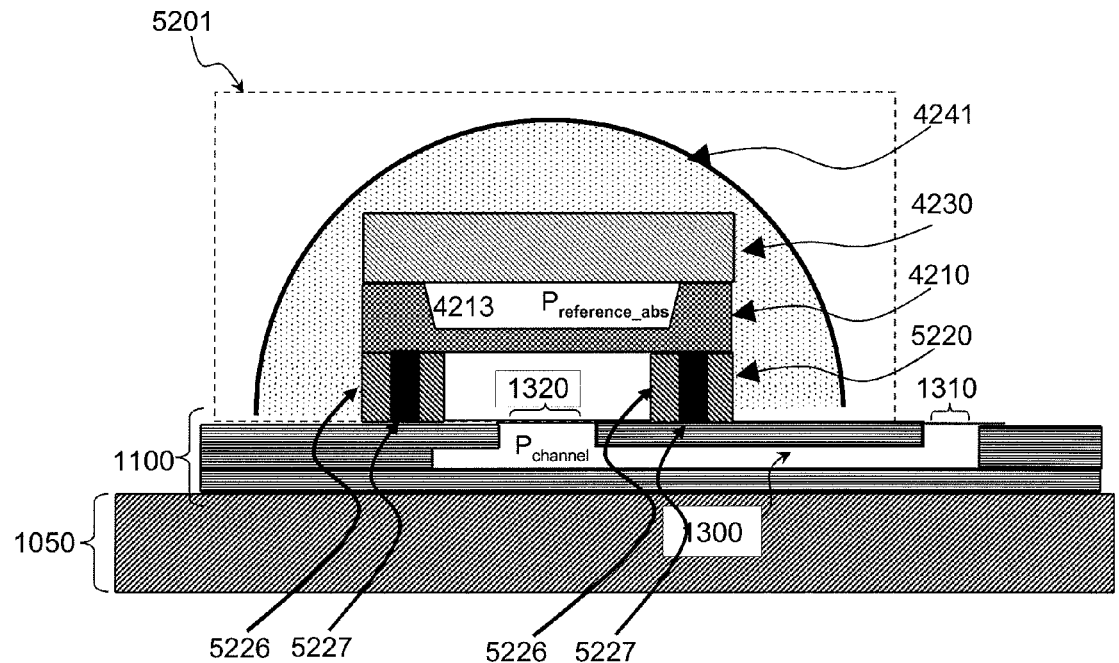
FIG. 5A is a schematic cross-sectional side view illustration of an absolute pressure measurement device according to an alternative embodiment of the invention, wherein the device is conformably adjusted on the surface of the object.
Figure 5B:
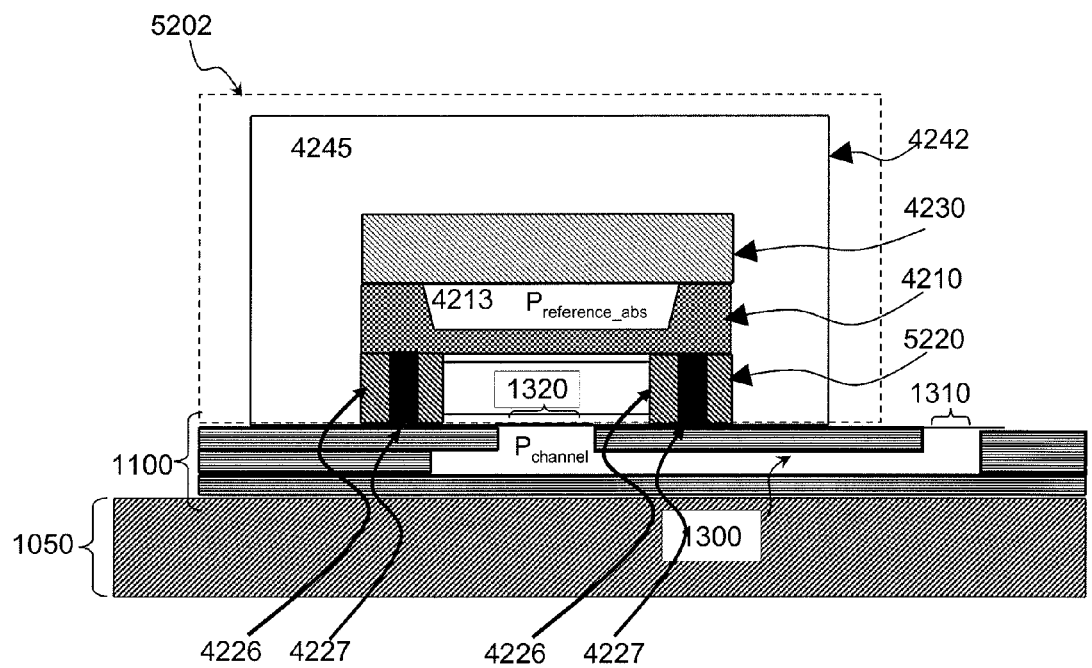
FIG. 5B is a schematic cross-sectional side view illustration of an absolute pressure measurement device according to another embodiment of the invention, wherein the device is conformably adjusted on the surface of the object.

Turning now to FIG. 5A and FIG. 5B, PSMs 1200 may be embodied, for example, by an absolute PSM 5201 and 5202, respectively. PSMs 5201 may include, for example, absorption means 5220 that are sandwiched between membrane 4210 and substrate 1100. As outlined hereinabove, membrane 4210 and substrate 1100 may each have different temperature-based coefficient of expansions. Thus, absorption means such as, for example, absorption means 5220 may be positioned between membrane 4210 and substrate 110, made of a material having a relative low modulus of elasticity of, e.g., less than 2 GPa, to avoid generating stress in membrane 4210 due a difference in temperature-induced expansion between membrane 4210 and substrate 1100. Such absorption means 5220 may comprise of a support 5226 that may include conducting-through-holes 5227 to enable sending to SP module 1400 signals generated due to pressure-induced deflection of membrane 4210. Support 4226 may be made of any suitable material such as, for example, pyrex or silicon based material. Optionally, as is schematically illustrated in FIG. 5A, absolute PSMs 5201 may comprise a protective cover such as, for example, dome-shaped coating 4241. Additionally or alternatively, as is schematically illustrated in FIG. 5B, an absolute PSM 5202 may be equipped with a protective cover embodied by housing 4242, which may be made of a substrate.

Figure 6:
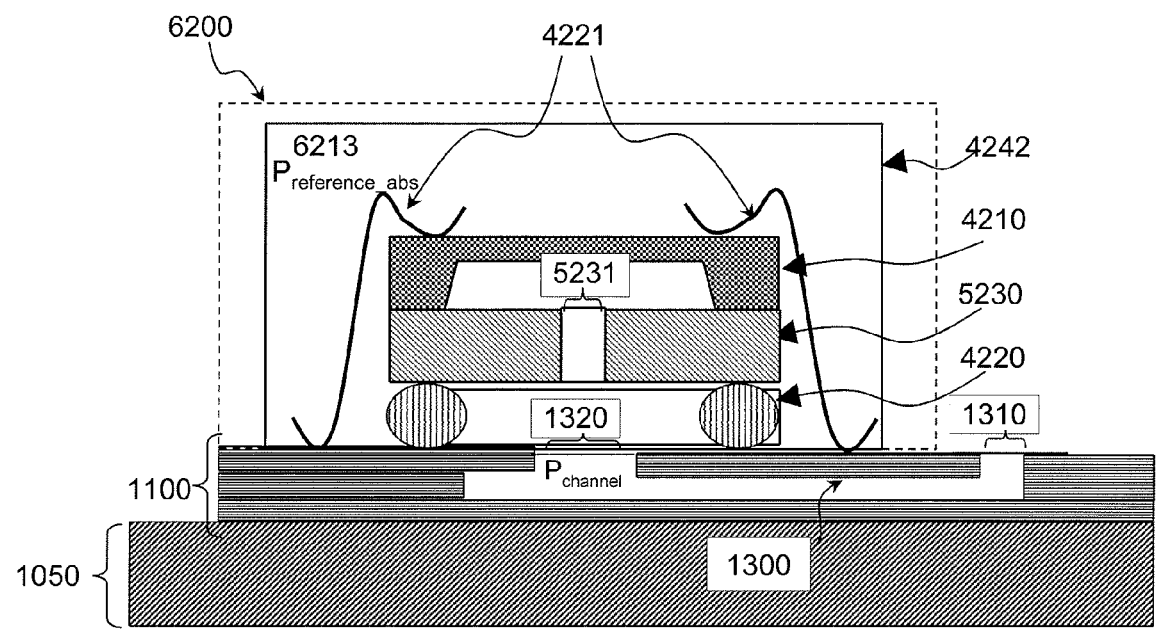
FIG. 6 is a schematic cross-sectional side view illustration of an absolute pressure measurement device according to a yet other embodiment of the invention, wherein the device is conformably adjusted on the surface of the object.

Further referring now to FIG. 6, PSM 1200 may optionally be embodied by absolute PSM 6200 comprising absorption means 4220 and 5220, respectively. Interface unit 5230, which comprises an opening 5231, is sandwiched between membrane 4210 and either to respective absorption means 4220 or 5220. As is schematically illustrated in FIG. 6, concave portion of membrane 4210 faces opening 5231. Absolute PSM 6200 may include a protective cover, which may be implemented by housing 4242, sealing membrane 4210, interface unit 5230 and absorption means 4220 from the ambient pressure, such that a vacuum may prevail in a cavity 6213 encompassed by said cover. Thusly configured, pressure $P_{channel}$ may work by means of membrane 4210 against a relatively very low reference pressure $P_{reference\_abs}$ of, e.g., 100 Pascal.

Generally speaking, differential pressure devices may be employed for the measurement of both small and large pressure variations and/or ranges, whereas absolute pressure sensor devices may only employable for the measurement of relatively large pressure variations. However, absolute pressure sensing device may in general be more simple devices as they may employ fewer elements than differential pressure devices.

Wire-bond 4221 may be made, for example, of gold or aluminum. Thusly, wire-bond 4221 may conduct signals that correspond to the deflection of membrane 4210, and both absorption means 4220 and interface unit 5230 can be made of insulating materials.

Reference is now made to FIGS. 7A, 7B, 8A, 8B and 9A, all of which schematically illustrate PSMs 1200 that are embodied by differential PSMs (The current PSM has N−1 differential pressure sensors, to measure the differential pressure to the reference pressure on the strip and 1 absolute pressure sensor to measure the reference pressure). It should be noted that the differential PSMs are all similarly configured, except for the differences indicated.

Figure 7A:
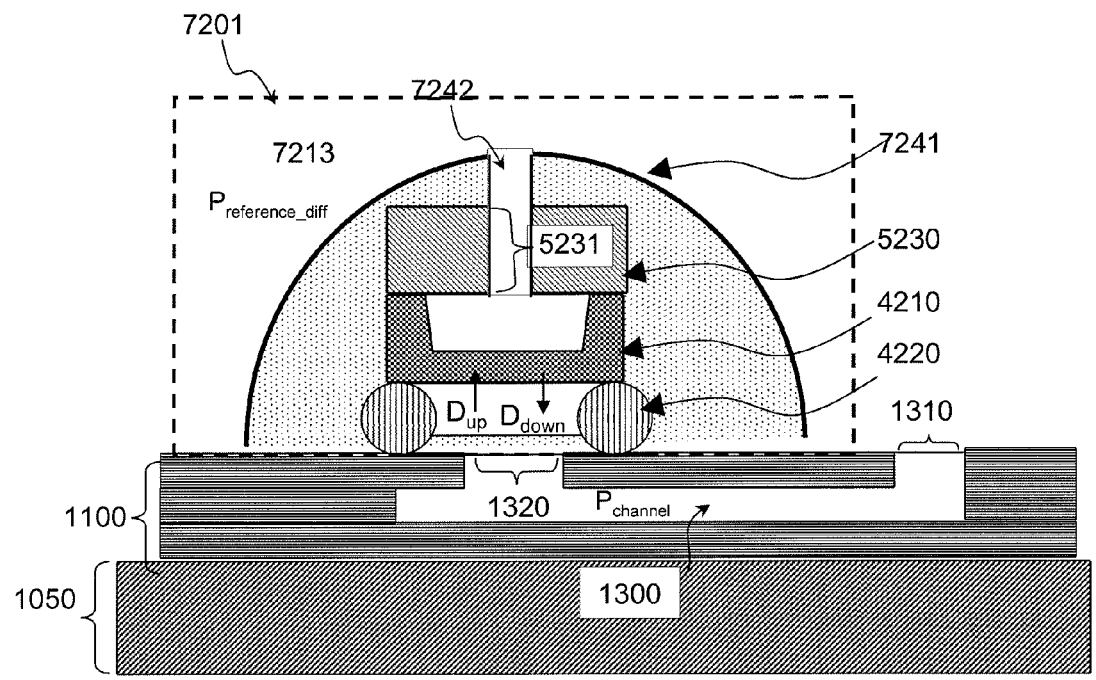
FIG. 7A is a schematic cross-sectional side view illustration of a differential pressure measurement device, according to an embodiment of the invention, wherein the device is conformably adjusted on the surface of the object.
Figure 7B:
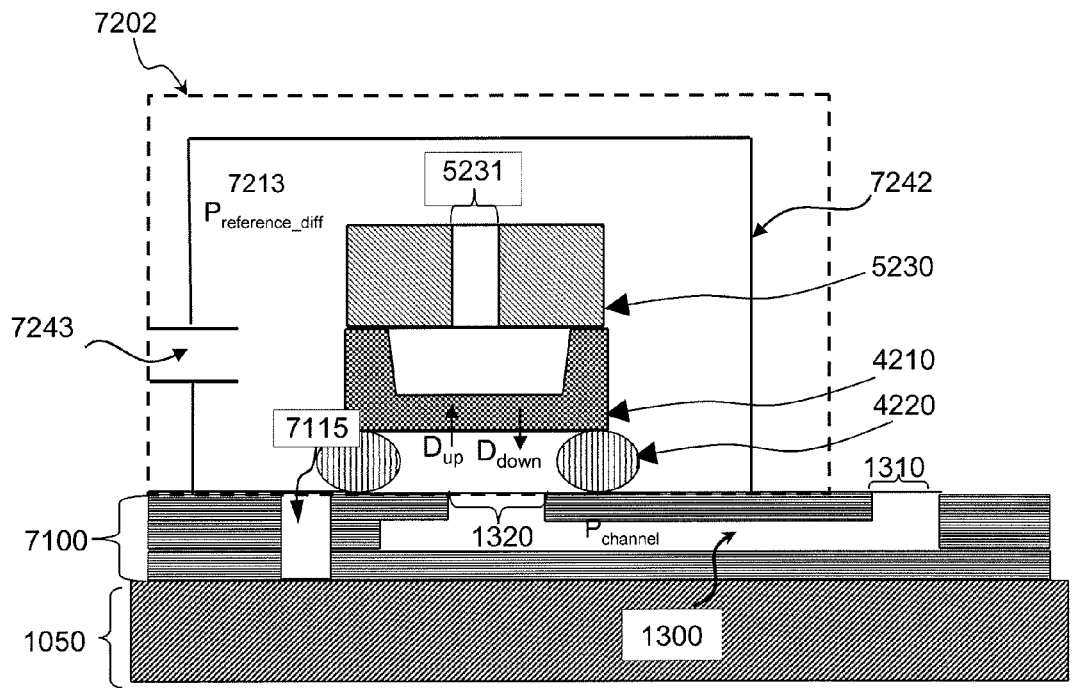
FIG. 7B is a schematic cross-sectional side view illustration of a differential pressure measurement device, according to another embodiment of the invention, wherein the device is conformably adjusted on the surface of the object.

As is schematically illustrated in FIG. 7A and FIG. 7B, differential PSMs 7201 and 7202 may each comprise absorption means 4220 that are sandwiched between substrate 1100 and membrane 4210. In addition, membrane 4210 is sandwiched between interface unit 5230 and absorption means 4220, whereby the concave part of membrane 4210 faces interface unit 5230. As already indicated herein, interface unit 5230 comprises an opening 5231, which may be open to pressure $P_{reference\_diff}$, which may be significantly higher than pressure $P_{reference\_abs}$ of a cavity such as, for example, cavity 4213, prevailing in upper cavity 4213 of absolute PSM 4201. Accordingly, upper cavity 7213 of differential PMS 7201 and 7202 may not have to be sealed and may thus, for example, be open to the atmosphere and accordingly be equal or close to atmospheric pressure. Fittedly adjusting on object 1050 a differential PSM pressure such as, for example differential PSM 7201 or 7202, may facilitate that membrane 4210 might not only deflect upwardly, as is schematically indicated with arrow $D_{up}$ but also downwardly, as is schematically indicated with arrow $D_{down}$. If for example, $P_{reference\_diff}$ equals to about, e.g., 100,000 Pascal (which may be considered as atmospheric pressure) and if pressure $P_{channel}$ is lower than 100,000 Pascal (e.g. 98,000 Pascal), then membrane 4210 may deflect downwardly ($D_{down}$). Conversely, if pressure P-channel established in channel 1300 is higher than the pressure $P_{reference\_diff}$, then membrane 4210 may deflect upwardly, as is schematically indicated with arrow $D_{up}$.

Differential PSM 7201 may optionally be equipped with a protective cover 7241 (FIG. 7A), which may have a dome-like shape and manufactured, e.g., as known in the art, from a glob top. Cover 7241 may have an opening 7242 that may be open to pressure $P_{reference\_diff}$ and operatively connected opening 5231 such that the upper side of membrane 4210 subjected to the pressure $P_{reference\_diff}$. Additionally or alternatively, as is schematically indicated in FIG. 7B, a protective cover may be implemented by a rectangularly shaped housing 7242, which may have an opening 7243 that is subjected to reference pressure $P_{reference\_diff}$. Alternatively, instead of substrate 1100, a substrate 7100 may be employed having an opening 7115 which is open to reference pressure $P_{reference\_diff}$. However, in either embodiment, pressure $P_{channel}$ prevailing in channel 1300 may work against the pressure $P_{reference\_diff}$. Accordingly, both differential PMS 7201 and 7202 may enable differential pressure measurements.

Referring to both FIG. 7A and FIG. 7B, at least some portion of absorption means 4220 may be conductive (e.g. by employing a conductive adhesive or solder) to enable the conductance of a signal generated due to a deflection of membrane 4210.

Figure 8:
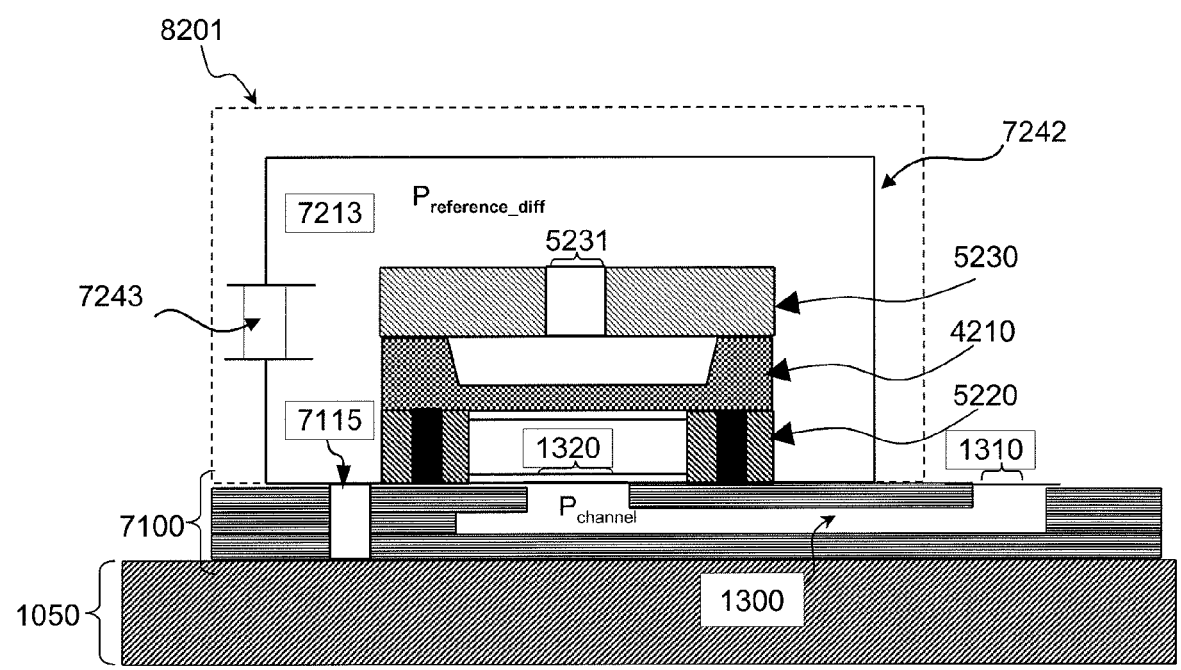
FIG. 8 is a schematic cross-sectional side view illustration of a differential pressure measurement device, according to an alternative embodiment of the invention, wherein the device is conformably adjusted on the surface of the object.

Further reference is now made to FIG. 8. According to some embodiments of the invention, a differential PSM 8201 may include absorption means 5220 beneath membrane 4210, instead of absorption means 4220.

It should be noted that configuring a PSM wherein concave side of membrane 4210 faces upwardly (i.e., away) from second opening 1320, may be useful in absolute PSMs (e.g. absolute PSM 5201), since such a configuration facilitates the guiding of pressure-induced signals out of the same absolute PSM.

Figure 9A:
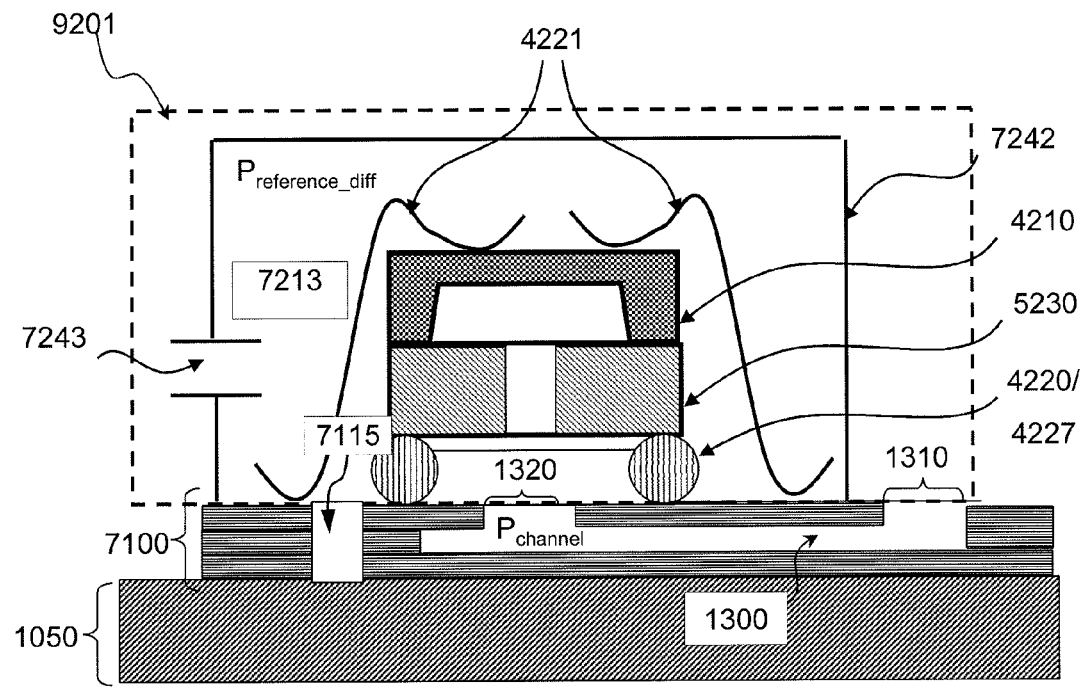
FIG. 9A is a schematic cross-sectional side view illustration of a differential pressure measurement device according to a yet other embodiment of the invention, wherein device is conformably adjusted on the surface of the object.
Figure 9B:
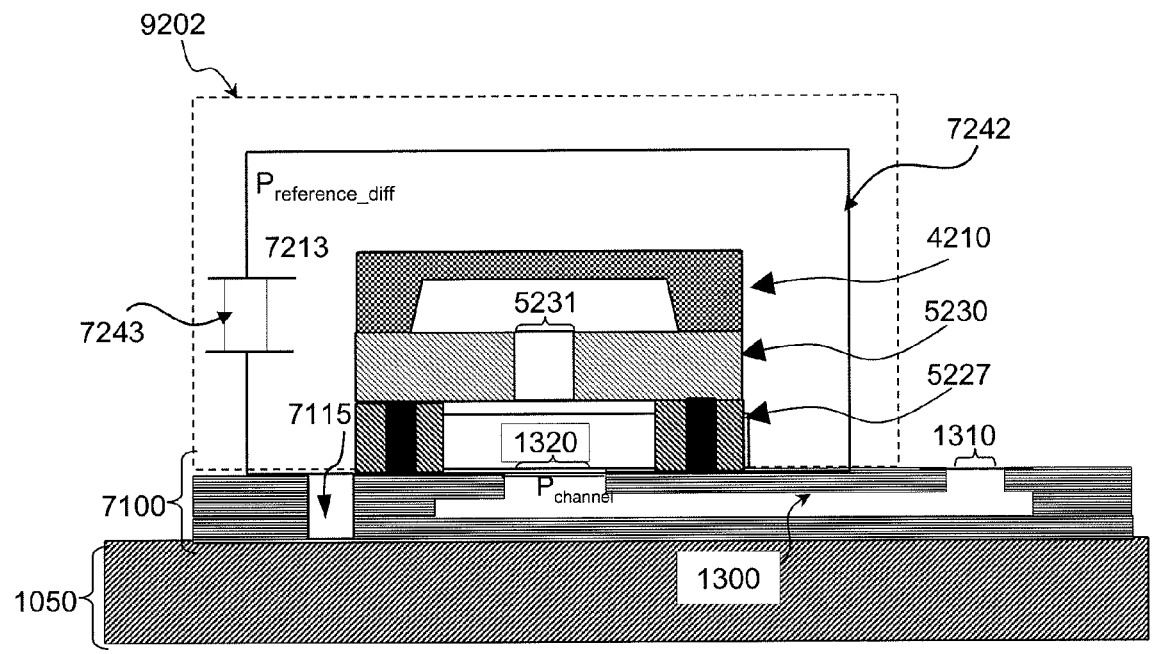
FIG. 9B is a schematic cross-sectional side view illustration of a differential pressure measurement device according to a yet alternative embodiment of the invention, wherein the device is conformably adjusted on the surface of the object.

Additional reference is now made to FIGS. 9A and 9B. According to some embodiments of the invention, a differential PSM 9201 and 9202 may be configured such that interface unit 5230 is sandwiched between membrane 4210 and either absorption means 4220 or 5220, respectively. Membrane 4210 may be provided onto interface unit 5230 such that the concave part of membrane 4210 faces opening 5231 of interface unit 5230 (and is thus subjected to $P_{channel}$), whereas the other side of membrane 4210 is subjected to reference pressure $P_{reference\_diff}$. Optionally, both differential PSM 9201 and 9202 may comprise protective coating 6240, which may have an opening 6241 open to pressure $P_{reference\_diff}$. In some embodiments of the invention, substrate 7100 having an opening 7115 open to reference pressure $P_{reference\_diff}$ may be used instead of substrate 1100.

As an alternative to wire-bond 4221 (FIG. 9A), differential PSM 9201 may employ for example, electrically conducting "Vias" such to conductively connect membrane 4210 with absorption means 4227 to an electric circuit (not shown) of a substrate such as substrate 7100. Similarly, differential PSM 9202 (FIG. 9B) may be configured such to conductively connect membrane 4210 with absorption means 5227 to the electric circuit (not shown) of substrate 7100. It should be noted alternative configurations may be employed for the conductive coupling of membrane 4210 with a substrate.

It should be noted that in some embodiments of the invention, pressure measurement device 1000 may comprise at least one absolute PSM as well as at least one differential PSM. Pressure measurement device 1000 may for example include N−1 differential PSM and 1 absolute PSM, wherein "N" represents the total number of PSMs in pressure measurement device 1000. Employing an absolute PSM is necessary to obtain $P_{reference\_abs}$ to able determining $P_{channel}$. Moreover, in some embodiments of the invention, pressure measurement device 1000 may be configured to measure $P_{reference\_diff}$ by employing, e.g., one or more suitable PSMs.

Figure 10A:
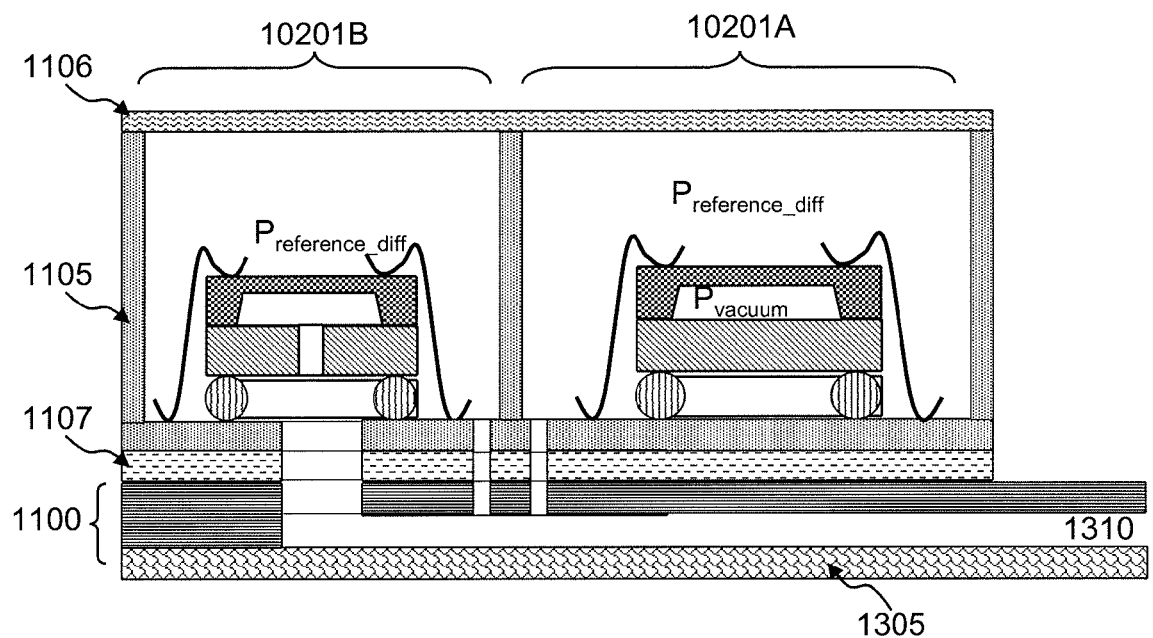
FIG. 10A is a schematic cross-sectional side view illustration of a pressure measurement device according to an embodiment of the invention.
Figure 10B:
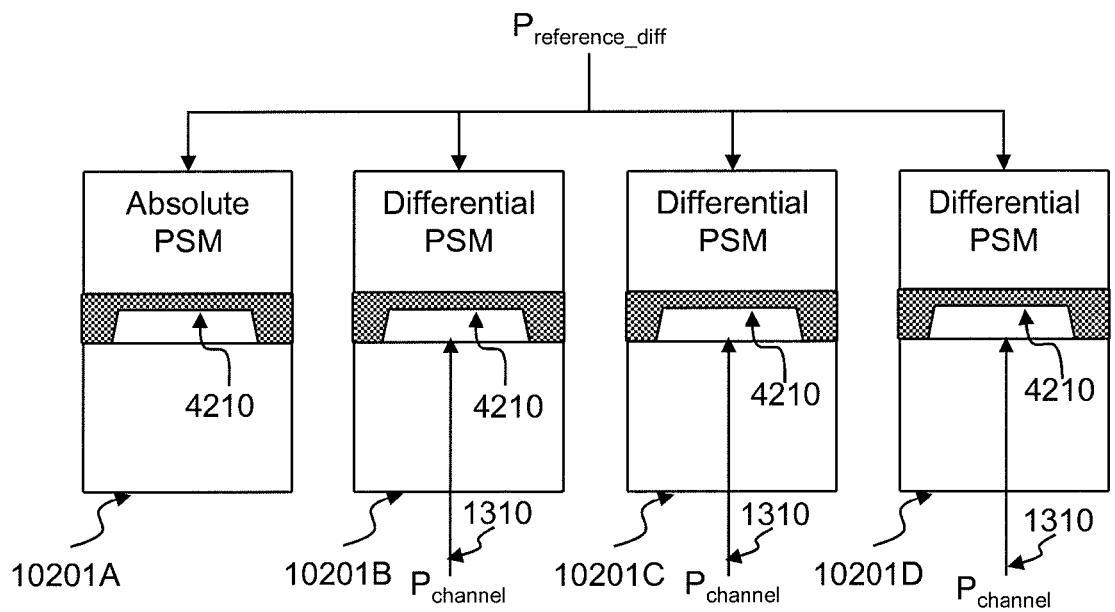
FIG. 10B is a schematic block-diagram illustration of the pressure measurement device of FIG. 10A.

Reference is now made to FIG. 10A and to FIG. 10B. In some embodiments of the invention, pressure measurement device 1000 may employ one absolute PSM 10201A and a plurality of differential PSMs such as, for example, differential PSMs 10201B, 10201C, 10201D, which are hereinafter referred to for exemplary purposes only. As is schematically illustrated, the upper part of all membranes 4210 is subjected to a single or substantially single reference pressure $P_{reference}$ prevailing at an inlet of substrate 1100, or which prevails at numerous inlets 1310 that are crowded closely together (i.e., the planar center-points of the numerous inlets 1310 are not more than 1 mm distant from each other. Further, the lower parts of membranes 4210 of the plurality of differential PSMs 10201B, 10201C and 10201D only are individually subjected to a respective pressure $P_{Pressure}$ prevailing in each channel 1310. Thusly configured, the value of the $P_{reference\_diff}$ can be determined by means of absolute PSM 10201A, consequently enabling determining the pressure $P_{channel}$ relative to $P_{reference\_diff}$.

An absolute PSM and/or a differential PSM such as, for example, absolute PSM 10201A and/or differential PSM 10201B may be covered by means of a detachable cover 1106 (made of, e.g., plastic) coupled to a PCB 1105, which may be made of a substantially rigid material. Accordingly, PCB 1105 and cover 1106 may thus constitute a protective housing such as, for example, housing 4242.

Further, one or more PSMs, such as PSMs 10201A and 10201B may be coupled onto substrate 1100 by means of a double-sided adhesive tape 1107.

Figure 11A:
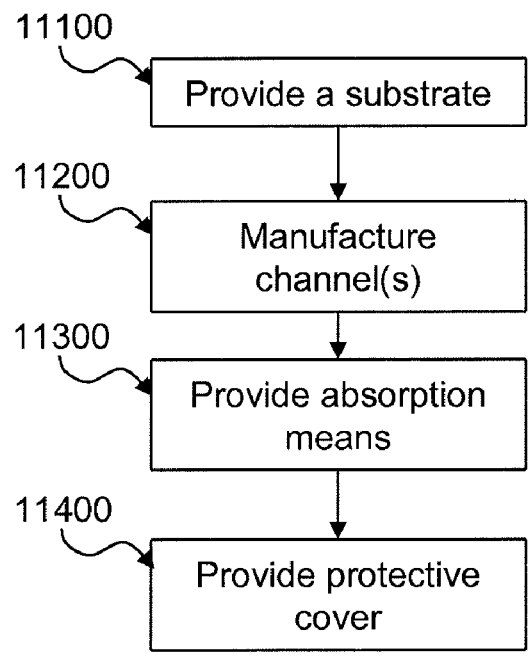
Figure 11B:
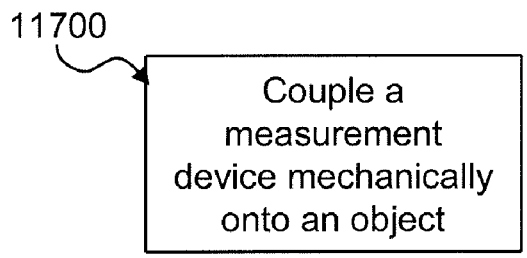
FIG. 11B is a flow-chart illustration of a method according to an embodiment of the invention, for using the pressure measurement device and system.

Reference is now made to FIG. 11A. As indicated by box 11100, a method for manufacturing a pressure measurement device 1000 according to an embodiment of the invention, may include, for example, providing a substrate such as substrate 1100 or substrate 7100. Such a substrate has planar-like dimensions enabling large-area covering of at least some part of the surface of object 1050.

Further, as indicated by box 11200, the method may include according to some embodiments of the invention, manufacturing at least one channel 1300 into the substrate, which may be embodied by substrate 1100 and/or substrate 7100. Such a channel 1300 may have a diameter that may range, for example, from 0.05 mm to 0.5 mm. Manufacturing of channels 1300 may be performed by employing a micro-milling machine.

As indicated by box 11300, the method may for example include providing absorption means around second aperture 1320 of channel 1300. Such absorption means may be embodied, for example, by absorption means 4220 or 5220. Absorption means 4220 and/or 5220 may be configured to compensate for movement of the substrate and may therefore be soft/pliable.

As indicated by box 11600, the method may include, for example, providing a protective coating over coupling means (e.g. absorption means 4220), membrane 4210 and an interface unit (e.g. interface unit 5230). The protective coating may be embodied, for example, by a dome-shaped coating 4241, which may be provided, for example, in the form of a glob top silicone substrate.

It should be noted that at least some of the elements of pressure measurement device 1000 may be manufactured, e.g., as known in the art. For example pyrex backing may be employed for manufacturing at least some of the device's elements.

In some embodiments of the invention, pressure measurement device 1000 is adapted to conformably adjust itself to contour changes of object 1050, even if pressure measurement device 1000 is already operatively adjusted on, e.g., upper surface 1051.

It should be noted that pressure measurement device 1000 may have alternative configuration to what has been described thus far. For example, channels 1300 may be configured such that some or all of PSMs 1200 are located on front surface 1103 of substrate 1100.

According to some embodiments of the invention, as indicated by box 11700, a method for using pressure measurement device 1000 and/or system 1001 may inter alia comprise the step of mechanically coupling measurement device 1000 by, e.g., low-force adhesives. Such adhesives establish a force of about less than 50 Newton (/cm$^2$) and preferably of less than 10 Newton/(cm$^2$).

Embodiments of the present invention may have advantages over U.S. Pat. No. 5,359,887 (hereinafter referred to as "patent '887"). As outlined herein, embodiments of the present invention enables direct measurement of the pressure distribution on at least some parts of the surface of object 1050. In distinct contrast, patent '887 only enables indirectly deriving a pressure by means of a pressure sensitive paint. Such a pressure sensitive paint may not be adjustable or easily adjustable to compensate for temperature-fluctuation induced measurement changes. Also, accuracy of pressure sensitive paint is limited to a maximum of about 0.5 bars, whereas embodiments of pressure measurement device 1000 enable measuring pressure at an accuracy of a few tenth of millibars. In contrast, embodiments of the present invention may be easily adjusted to compensate for measurement changes caused by temperature fluctuations. In addition, pressure sensitive paints may not be employed when being exposed to light (e.g., sunlight). In contrast, embodiments of the invention may be employed on objects exposed to light. As opposed to pressure sensitive paints, embodiments of the invention may not contaminate object 1050 and/or surrounding ambient, may be used for the pressure measurement exerted by other fluids than air.

The present invention may also have advantages over U.S. Pat. No. 5,983,727, which discloses a sensor that is based on change of capacitance. This measuring method indirectly measures the distance between the two insulating plates instead of measuring the pressure/force on the membrane directly. This type of sensor is susceptible to temperature and/or mechanical stress. Moreover, polymer membranes as opposed to monocrystalline silicon membranes do have a hysteresis. Capacitance is more susceptible to electromagnetic fields than sensors based on piezo-responsive materials.)

The present invention may further have advantages over U.S. Pat. No. 6,662,647. Packaging of the present invention is far less complex and PSMs of the present invention may be located away from the locations of an object's boundary for which pressure is to be measured. Moreover, the invention disclosed in disclosed in U.S. Pat. No. 6,662,647 does not enable measuring the pressure distribution for a large area. Further in contrast to U.S. Pat. No. 6,662,647, the present invention is less susceptible to hysteresis.

Embodiments of the present invention may also have advantages over U.S. Pat. No. 6,826,968 such as, for example, in that embodiments of the present invention are far less sensitive to electrical noise than capacitive sensors (implemented as e.g. compressible dielectrics). Piezo-resistive pressure sensors have a silicon membrane which is monocrystalline and may therefore have a much smaller hysteresis than polymer membranes. As already indicated herein, capacitive based sensors are based on the on differences in distance whereas sensors employing piezo-responsive material measure the stress exposed on the membrane due to pressure directly.

Embodiments of the present invention may also have advantages over U.S. Pat. No. 7,127,948 such as, for example, in that PSMs may be distantly located from the area for which pressure ought to be measured.

Pressure measurement device 1000 and system 1001 may have additional advantages over the devices and systems used in the art. Pressure measurement device 1000 does not have hysteresis, as it is implemented by means of piezo-responsive materials, has high pressure sensitivities of, e.g., 20 mV/kPa or 2 mV/mbar (without amplification), and enable therefore measuring a pressure at a relatively high resolution compared to, for example, capacitively based pressure sensors. Membrane 4210 may be made of a monocrystalline material and may thus not be subjected to any mechanical wear compared to other material such as polymer based sensors, which may be employed, for example, in piezoelectric and compressible dielectric based PSM. In some embodiments of the invention, pressure measurement device 1000 and optionally pressure measurement system 1001 may be employed under harsh environmental conditions (e.g. temperature, dust, dirt and the like) and may be waterproof. Pressure measurement device 1000 may be easily repositionable by using, for example, low-force coupling means (e.g. low-force adhesives) to conformably couple device 1000 onto object 1050.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described. Therefore, it should be understood that alternatives, modifications, and variations of the present invention are to be construed as being within the scope of the appended claims.

What is claimed is:

1. A pressure measurement device, said pressure measurement device comprising:
   a substrate having at least one fluid-conductive channel therein, each channel of the at least one channel having a first aperture at a first end thereof and a second aperture at a second end thereof; and
   at least one pressure sensing module, each of the at least one pressure sensing module being
   operatively connected to a corresponding second aperture;
   wherein said substrate is flexible such that said pressure measurement device is conformably adjustable onto an object's surface; and
   wherein each first aperture and each second aperture of each channel of said at least one channel are located on a surface of said substrate such that when said substrate is suitably adjusted onto the object's surface, each aperture of said at least one first aperture is open to the exterior of said object's surface, and
   each channel corresponding to each open first aperture is structured and arranged so that a pressure sensing module disposed at the second end thereof is substantially subjected to pressure at said open first aperture.

2. The pressure measurement device according to claim 1, wherein said at least one first aperture is remotely located from the pressure sensing module.

3. The pressure measurement device according to claim 1, wherein said pressure sensing module comprises a membrane made of a piezo-responsive material.

4. The pressure measurement device according to claim 3, wherein said piezo-responsive material is one of a piezo-resistive and piezo-electric material.

5. The pressure measurement device according to claim 3, further comprising an interface unit responsive to changes in the piezo-responsive material membrane and absorption means sandwiched between said substrate and one of said membrane and said interface unit to avoid generating stress in said membrane generated due a difference in temperature-based expansion between said membrane and said substrate.

6. The pressure measurement device according to claim 1, wherein said pressure sensing module is one of an absolute pressure sensing module and a differential pressure sensing module.

7. The pressure measurement device according to claim 1, said at least one channel having a diameter ranging between 0.05 and 0.5 mm.

8. The pressure measurement device according to claim 1, wherein said substrate has a thickness of less than 1 mm.

9. A pressure measurement system, said system comprising:
   a signal processing (SP) module; and
   a pressure measurement device that includes:
      a substrate having at least one fluid-conductive channel therein, each channel of the at least one channel having a first aperture at a first end thereof and a second aperture at a second end thereof, wherein said substrate is flexible such that said pressure measurement device is conformably adjustable onto an object's surface, and
      at least one pressure sensing module (PSM), each of said at least one PSM being operatively connected to said SP module,
   wherein each of said at least one pressure sensing module is operatively connected to a corresponding second aperture;
   wherein each first aperture and each second aperture of each channel of said at least one channel are located on a surface of said substrate such that when said substrate is suitably adjusted onto the object's surface, each aperture of said at least one first aperture is open to the exterior of said object's surface, each of said at least one PSM therefore generally being substantially subjected to a pressure present at a corresponding first aperture of said at least one first aperture.

10. The pressure measurement system according to claim 9, wherein said PSM is adapted to transmit wirelessly to said SP module data representing information about the pressure prevailing in said channels.

11. The pressure measurement system according to claim 9, wherein said first at least one aperture is located remotely from said PSM.

12. The pressure measurement system according to claim 11, wherein said first at least one aperture is located remotely from said PSM by at least 10 cm.

13. The pressure measurement system according to claim 9, wherein said at least one PSM is one of an absolute PSM and a differential PSM.

14. A pressure measurement device, said pressure measurement device comprising:
   a substrate having at least one fluid-conductive channel therein, each channel of the at least one channel having a first aperture and a second aperture;
   at least one pressure sensing module having a membrane made of a piezo-responsive material,
   wherein said pressure sensing module is operatively connected to a corresponding second aperture;
   an interface unit responsive to changes in the piezo-responsive material membrane; and
   absorption means sandwiched between said substrate and one of said membrane and said interface unit, to avoid generating stress in said membrane generated due to a difference in temperature-based expansion between said membrane and said substrate;
   wherein said substrate is flexible such that said pressure measurement device is conformably adjustable onto an object's surface, and wherein said at least one first aperture is located on said substrate such that when said substrate is suitably adjusted onto the object's surface, said at least one first aperture is open to the exterior of said object's surface, said at least one pressure sensing module is substantially subjected to a pressure at said at least one first aperture.

* * * * *

UNITED STATES PATENT AND TRADEMARK OFFICE
CERTIFICATE OF CORRECTION

PATENT NO. : 7,788,981 B2  
APPLICATION NO. : 12/075864  
DATED : September 7, 2010  
INVENTOR(S) : Noa Schmid et al.

Page 1 of 1

It is certified that error appears in the above-identified patent and that said Letters Patent is hereby corrected as shown below:

Column 9, line 7, "pressure, measurement" should read -- pressure measurement --; and Column 13, line 53, "P-channel" should read -- $P_{channel}$ --.

Signed and Sealed this

Second Day of October, 2012

David J. Kappos  
*Director of the United States Patent and Trademark Office*